United States Patent [19]
Downs et al.

[11] Patent Number: 6,111,562
[45] Date of Patent: *Aug. 29, 2000

[54] SYSTEM FOR GENERATING AN AUDIBLE CUE INDICATING THE STATUS OF A DISPLAY OBJECT

[75] Inventors: Terry Downs, Portland; Gunner D. Danneels, Beaverton, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/779,142

[22] Filed: Jan. 6, 1997

[51] Int. Cl.$^7$ ............................................. G06F 15/00
[52] U.S. Cl. ................................ 345/145; 345/357
[58] Field of Search ................................ 345/326–358, 345/978, 145, 146, 157

[56] References Cited

U.S. PATENT DOCUMENTS

| | | | |
|---|---|---|---|
| 4,698,625 | 10/1987 | McCaskill et al. | 345/145 X |
| 5,186,629 | 2/1993 | Rohen | 340/825.19 X |
| 5,223,828 | 6/1993 | McKiel, Jr. | 340/825.19 |
| 5,287,102 | 2/1994 | McKiel, Jr. | 345/978 X |
| 5,461,399 | 10/1995 | Cragun | 345/145 |
| 5,511,187 | 4/1996 | Cragun | 345/978 X |
| 5,715,412 | 2/1998 | Aritsuka et al. | 395/978 X |
| 5,726,681 | 3/1998 | Kanamori | 345/145 |
| 5,742,779 | 4/1998 | Steele et al. | 345/978 X |
| 5,805,165 | 9/1998 | Thorne, III et al. | 345/348 |
| 5,990,862 | 11/1999 | Lewis | 345/145 |

OTHER PUBLICATIONS

Brown et al., "Special Edition Using Netscape 3", QUE Corp., p. 460, 1996.

*Primary Examiner*—Steven Sax
*Attorney, Agent, or Firm*—Blakely, Sokoloff, Taylor & Zafman LLP

[57] ABSTRACT

A system indicates the status of a display object using an audible cue. The system associates a particular audible cue with each display object. The audible cue associated with the display object is generated if a pointer is positioned proximate the display object. The display object has an associated object activation region and the pointer has an associated activation region. The audible cue associated with the display object is generated when the object activation region intersects the activation region associated with the pointer.

24 Claims, 7 Drawing Sheets

FIG. 5

| | |
|---|---|
| file 1 | file 11 |
| file 2 | file 12 |
| file 3 | file 13 |
| file 4 | file 14 |
| file 5 | file 15 |
| file 6 | file 16 |
| file 7 | file 17 |
| file 8 | file 18 |
| file 9 | file 19 |
| file 10 | file 20 |

FIG. 6

| | |
|---|---|
| file 1 | file 11 |
| file 2 | file 12 |
| file 3 | file 13 |
| file 4 | file 14 |
| file 5 | file 15 |
| file 6 | file 16 |
| file 7 | file 17 |
| file 8 | file 18 |
| file 9 | file 19 |
| file 10 | file 20 |

SYSTEM FOR GENERATING AN AUDIBLE CUE INDICATING THE STATUS OF A DISPLAY OBJECT

BACKGROUND OF THE INVENTION

1. Field of the Invention

The present invention relates to a system for indicating the status of a display object by providing an audible cue when the display object is selected or otherwise identified.

2. Background

Computer interfaces, such as Graphical User Interfaces (GUIs), may display various types of objects such as text, pictures, filenames, icons, cursors, and similar objects. A particular computer interface may display multiple objects of different types or classes. Similarly, informational sources such as web pages or web sites often display multiple types of objects to the user. In certain instances, it may be desirable to provide a system that permits the user of the computer to easily distinguish between different types of displayed objects. For example, when displaying multiple filenames, it may be desirable to identify the type of file associated with each filename (e.g., text file, data file, executable file, audio file, or video file). By identifying the type of file associated with each filename, the user is able to determine how the file may be used and which programs can use the file.

Various systems have been developed to display information to a user regarding the type of file associated with a filename or other object. For example, an icon or other graphical image may be displayed adjacent to the filename to indicate the file type (such as a speaker next to an audio file or a page of text next to a text file). However, the icon or graphical image occupies a portion of the display, thereby reducing the area available for displaying other information.

Other known systems use different colors to identify the type or status of an object on the display. For example, web browsers used to browse the Internet represent navigational links to other web pages in different colors. The color associated with a particular navigational link is based on whether the web page identified by the link is new to the user (i.e., not yet viewed or explored by the user). Thus, the user can determine whether a particular web page was previously visited by determining the color associated with the link to the web page. However, this color system is not helpful to the user if the user's display is monochrome or the user is colorblind.

It is therefore desirable to provide a system for indicating the status of a display object without requiring the use of visual identifiers such as different colors or graphical images.

SUMMARY OF THE INVENTION

The present invention provides a system for indicating the status of a display object identified by providing an audible cue when the display object is selected or otherwise identified. The audible cues allow the user to distinguish between different types of display objects or distinguish between the status of different display objects.

An embodiment of the present invention provides a system for indicating the status of a display object by associating an audible cue with the display object. The system then generates the audible cue associated with the display object if a pointer is positioned proximate the display object.

Another aspect of the invention provides an object activation region associated with the display object and an activation region associated with the pointer. The audible cue is generated if the object activation region intersects the activation region associated with the pointer.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 5 illustrates an example video display containing multiple display objects identifying files.

FIG. 6 illustrates the video display of FIG. 5, including a cursor, cursor activation region, and various object activation regions.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, components, algorithms, and circuits have not been described in detail so as not to obscure the invention.

The present invention provides a system for generating an audible cue indicating the status of a display object. The audible cue may be used alone or in combination with other indicators such as visual indicators (e.g., icons or color-coding). The audible cue is helpful to colorblind users and may be utilized with monochrome monitors as well as color monitors.

Figure 1:
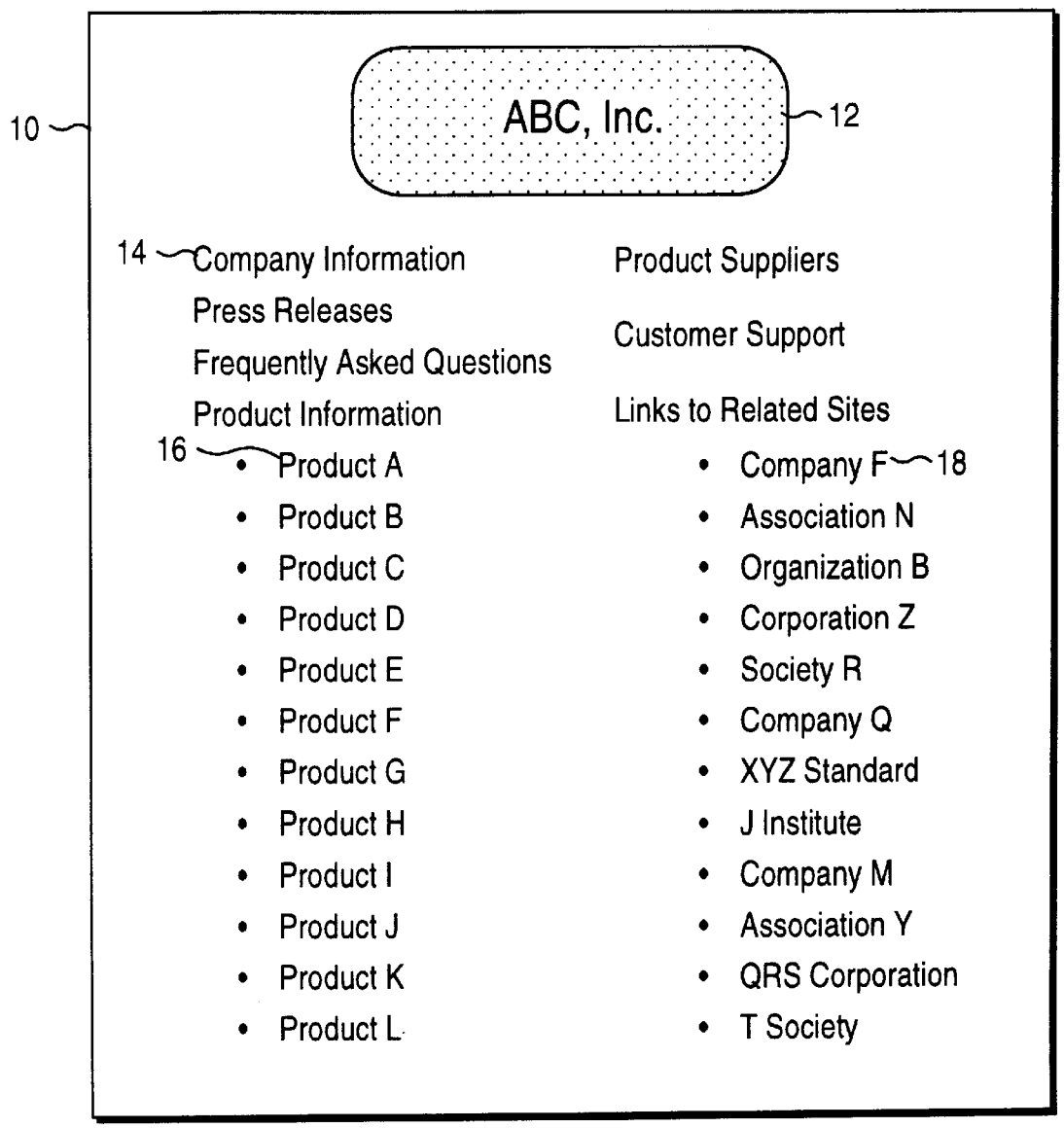
FIG. 1 illustrates an example Internet web page displayed by a web browser.

FIG. 1 illustrates an example Internet web page 10 displayed by a web browser. Various types of web browsers and other systems for displaying information may utilize the teachings of the present invention. Web page 10 shown in FIG. 1 includes a company name and logo 12 as well as various navigational links 14, 16, and 18 to other web pages. The various links and types of information illustrated in FIG. 1 are provided as an example for explanation purposes. However, those of ordinary skill in the art will appreciate that numerous links, graphical images, text, and other types of information may be contained in a particular web page.

The various navigational links illustrated in web page 10 may have different states. The state of a particular navigational link may also be referred to as the link's status. For example, three different states may be associated with a navigational link. First, a link may be unexplored (e.g., not viewed or otherwise accessed by the user of the computer). Second, a navigational link may be "explored", meaning that the user has previously viewed or accessed the web page associated with the link. Typically, a web browser is responsible for maintaining the state or status of the various navigational links displayed on a particular web page. A time limit may be associated with the explored and unexplored states (e.g., links that were explored more than 30 days ago may be considered to be unexplored). A third possible state for a navigational link is "jumped to." This state indicates that the particular navigational link has been selected by the user, but the associated web page has not yet been displayed. The "jumped to" state is an intermediate state that is entered before the explored state has been reached. The duration of the "jumped to" state is limited to the time required for the server associated with the link to respond by transmitting the web page information across the network.

The use of audible cues is particularly useful with respect to navigational links in a web page. Referring again to FIG. 1, a series of links to web pages associated with various products (products A–L) are provided in web page 10. Existing web browsers may display the different product links in different colors to indicate whether the particular link has been previously explored by the user. However, to a colorblind user or a user having a monochrome monitor, the use of color-coded links is not helpful.

As discussed below, various audible sounds or cues may be associated with one or more states associated with navigational links on a particular web page. Typically, the sounds or cues are associated with a link state rather than associating sounds or cues with specific links. However, alternate embodiments of the invention may permit the association of sounds or cues with one or more specific navigational links. As a cursor or pointer is moved across the web page, the user receives audible cues related to the state of the navigational links. If the state of a particular navigational link has an associated sound, that sound will be generated as the cursor moves across the link. The cursor or pointer may be controlled by any pointing device such as a mouse, track ball, or light pen.

The audible cues allow the user to quickly identify explored links or unexplored links from a list of navigational links. For example, referring to web page 10 in FIG. 1, the user may have previously viewed particular product information associated with a navigational link, but cannot remember the particular link or product name that was viewed. By configuring the web browser to generate an audible cue for all navigational links having an explored state, the user can quickly identify web pages associated with previously viewed links. For example, the user may move the cursor or pointer along the list of navigational links associated with products A–L. Each link that has an explored state will generate an audible cue as the cursor moves over that link. Thus, the user can quickly focus on the previously searched links to locate the desired information.

Similarly, the user may move the cursor along the various navigational links to related sites (located along the right-hand side of web page 10) in an attempt to locate a previously viewed web page.

In another situation, a user may wish to view unexplored web sites. In this example, an audible cue is associated with all the unexplored link state. As the cursor is moved over a list of navigational links, an audible cue is generated each time the cursor moves across a link having the unexplored state.

In the above examples, an audible cue is associated with one of the possible link states. Alternatively, two different sounds may be utilized. A first sound is associated with the explored link state and a second sound is associated with the unexplored link state. Thus, each link (except links having the "jumped to" state) will generate an audible cue indicating the state of the link (i.e., whether the link is explored or unexplored).

The use of audible cues may be incorporated into a variety of web browsing products. The audible cues may be selected from various audio files or sound files of any type capable of being utilized by the browsing system. As discussed above, the user may associate a particular sound with a particular state or status of a navigational link. Similarly, an audible cue may be used to distinguish between different types of objects displayed on a web page. For example, a particular web page may include textual information not associated with a particular link, pictures and other graphical information, and navigational links. The user may choose to associate a particular sound with a navigational link. In this situation, the audible cue will be generated each time the cursor is moved across a navigational link, but the cue will not be generated when the cursor is moved across textual information or graphical information in the web page. As discussed above, multiple sounds may be associated with different link states or objects in the web page. For example, a first sound may be associated with textual information and a second sound associated with navigational links. The association of one or more sounds with link states or objects can be determined by the user of the system. Additionally, a particular set of default values may be provided that can be modified by the user.

As mentioned above, the use of audible cues is helpful to a colorblind user or a user having a monochrome monitor. However, the audible cues may also be used in combination with visual cues, such as color-coded navigational links. By providing both audible cues and visual cues to the user, the multiple sensory cues generate a greater impact on the user of the system, thereby reinforcing the status of the information conveyed by the cues.

Figure 2:
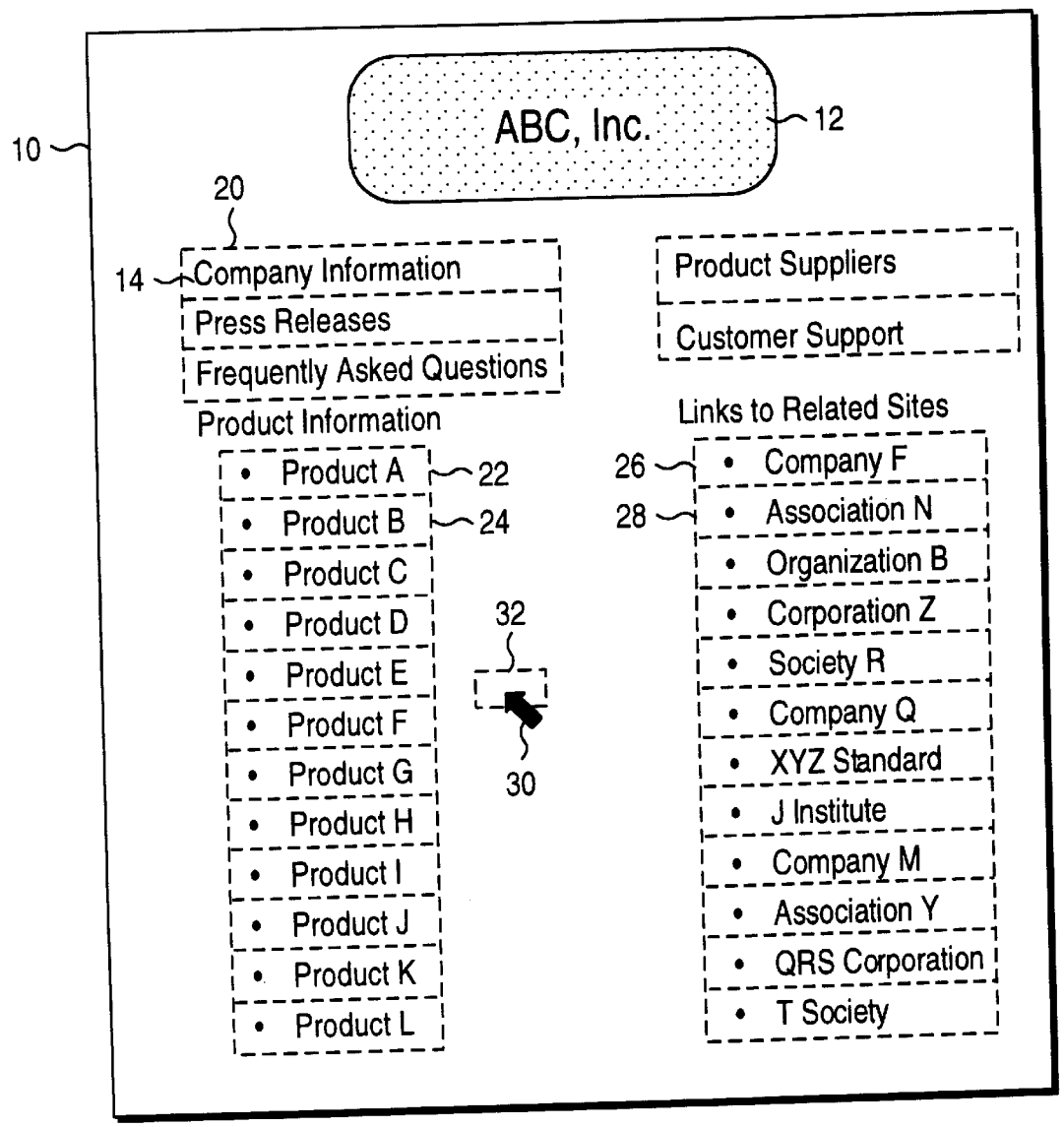
FIGS. 2 and 3 illustrate the web page of FIG. 1, including a cursor, cursor activation region, and various object activation regions.

FIG. 2 illustrates the web page of FIG. 1, including a cursor 30, and various activation regions associated with the display objects and the cursor. Cursor 30 is one example of a pointer that may be used to select one or more display objects. Each navigational link in web page 10 includes an activation region (also referred to as an object activation region) associated with the link. For example, company information link 14 has an associated object activation region 20 identified by broken lines. Similarly, the navigational link for product A includes an object activation region 22 and the navigational link for product B includes an object activation region 24. Cursor 30 has an associated cursor activation region 32. The object activation regions and cursor activation region define the boundaries of the object and cursor, respectively. As illustrated in FIG. 2, each navigational link has an associated object activation region. Cursor activation region 32 illustrates one example of the size of the cursor activation region. Those of ordinary skill in the art will appreciate that cursor activation region 32 may have various sizes ranging from a small region surrounding the point of the cursor to a large region surrounding the entire cursor. Similarly, object activation regions may have a range of different sizes.

The audible cue associated with a particular navigational link in web page 10 is generated when the object activation region for the link intersects the cursor activation region. As shown in FIG. 2, cursor activation region 32 does not intersect any object activation region in web page 10. However, as the cursor is moved around the web page, cursor activation region 32 may intersect one or more object activation regions.

Figure 3:
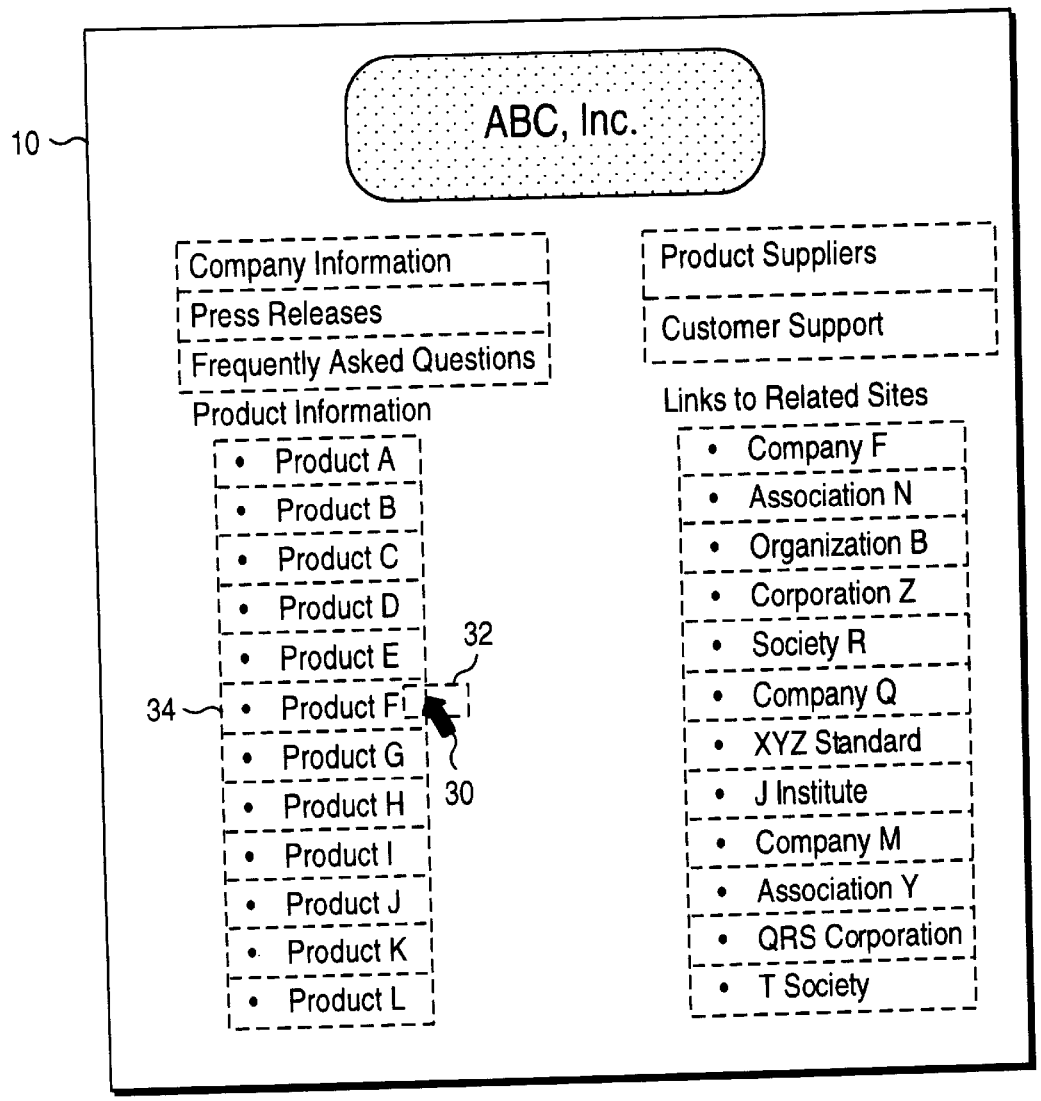

FIG. 3 illustrates the web page of FIG. 2, with cursor 30 in a different location. In FIG. 3, cursor activation region 32 intersects object activation region 34, which is associated with the navigational link to product F. In this situation, if an audible cue is associated with the state of the link to product F, then the cue is generated. Depending on the state of the link to product F, an audible cue may not be generated. For example, if the link to product F has already been explored, and the browser is configured to generate an audible cue for unexplored links, there may not be an audible cue associated with explored links. Alternatively, an audible cue can be associated with explored links, but the cue is silent (e.g., a null sound file).

In certain situations, the cursor activation region may intersect two or more object activation regions simultaneously. In this situation, an arbitration scheme may be used to determine which audible cue will be activated. In one embodiment of the invention, an arbitration scheme may determine which object activation region contains the maximum intersection area with the cursor activation region. Alternatively, a priority list or other scheme may be utilized to select among multiple intersected object activation regions.

Figure 4:
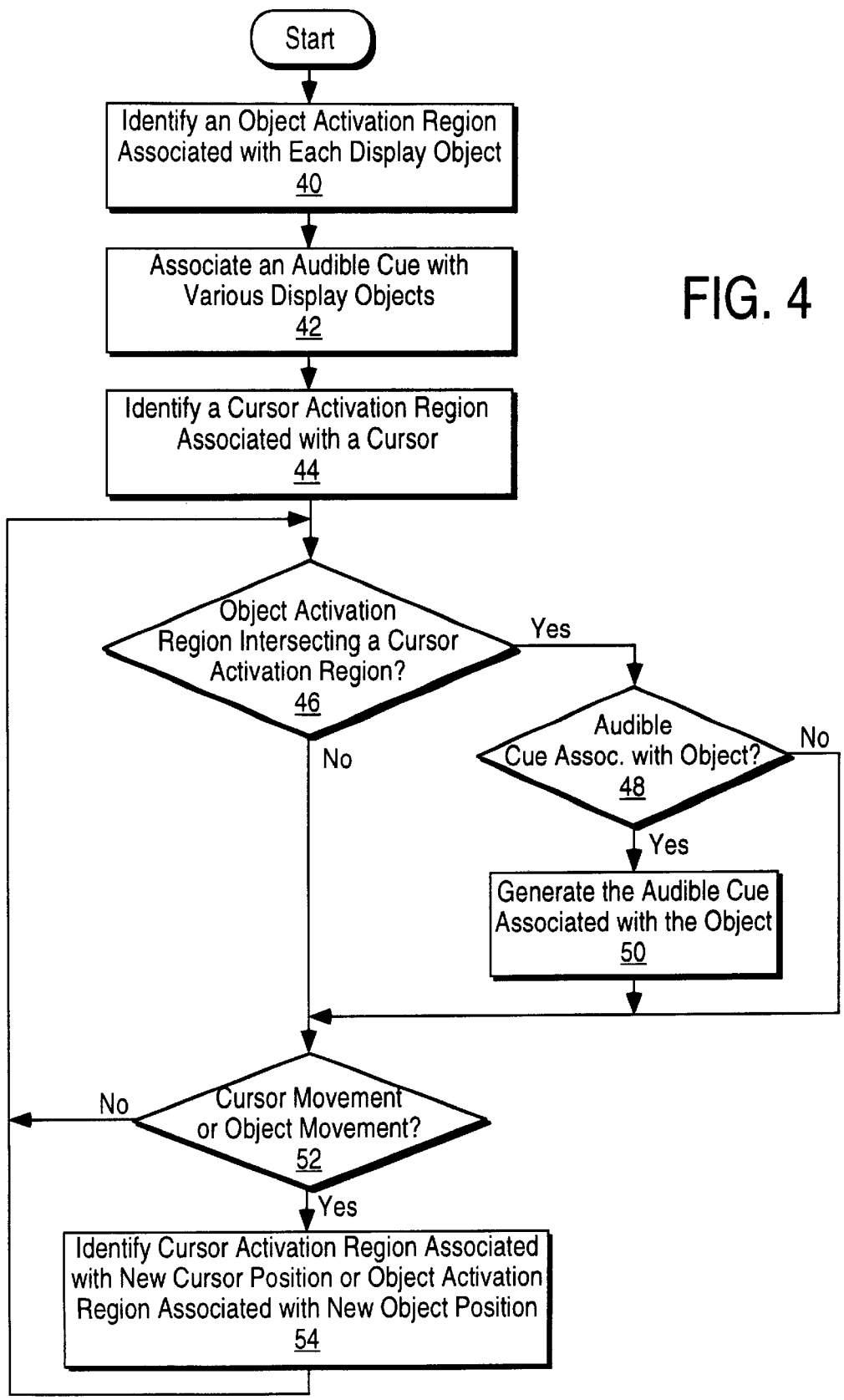
FIG. 4 is a flow diagram illustrating an embodiment of a procedure for generating an audible cue.

FIG. 4 is a flow diagram illustrating an embodiment of a procedure for generating an audible cue. At step 40, the procedure identifies an object activation region associated with each display object. Various procedures may be used to establish object activation regions for display objects. In one embodiment of the invention, an object activation region is established for every display object, even it the display object has no associated audible cue (or the associated cue is a null file). Alternatively, an object activation region may be established only for those display objects having an associated audible cue (or an associated cue that is not a null file). Those of ordinary skill in the art will appreciate that other procedures may be utilized to establish object activation regions for display objects.

At step 42 of FIG. 4, an audible cue is associated with various display objects or object types (such as the link state). Step 44 identifies a cursor activation region associated with a cursor or pointer. At step 46, the procedure determines whether the object activation region intersects a cursor activation region. If the two regions intersect at step 46, then the procedure branches to step 48 to determine whether an audible cue is associated with the object or object type (i.e., the object associated with the intersected object activation region). If an audible cue is not associated with the object or object type at step 48, then the procedure branches to step 52 to determine whether cursor movement or object movement has occurred. If an audible cue is associated with the object at step 48, the procedure continues to step 50 where the audible cue associated with the object is generated. As discussed above, in certain situations the audible cue may be a null file that does not actually generate a sound or cue.

Step 52 of FIG. 4 determines whether the cursor or an object has moved from it's previous position. If the cursor and objects have not moved, then the procedure returns to step 46. If cursor movement or object movement is detected at step 52, then the procedure continues to step 54 where a cursor activation region is identified and associated with the new cursor position or an object activation region is identified and associated with the new object position. The procedure then returns to step 46.

FIG. 5 illustrates an example video display 60 containing multiple display objects (filenames) identifying particular files. Although not shown in FIG. 5, a video display may include additional display objects such as icons, graphical items, and other information. The files illustrated in FIG. 5 may be of various types, such as program files, audio files, video files, and text files. The "type" of file may also be referred to as the file's "status." In the example of FIG. 5, the user cannot distinguish between the file types based on the filenames illustrated. Therefore, an audible cue may be utilized to indicate the status or type of file associated with each file name. For example, if a user is searching for video files, the system may be set to generate an audible cue when a cursor is moved across a filename associated with a video file.

FIG. 6 illustrates the video display of FIG. 5, including a cursor 64 having an associated cursor activation region 66. The position of cursor 64 shown in FIG. 6 is intersecting object activation region 62 associated with file 15. Thus, if an audible cue is associated with file 15, the cue will be generated. The use of audible cues with a list of filenames is particularly useful where the filenames are not descriptive of the type of file associated with the name or not descriptive of the type of program with which the file is used.

Alternatively, multiple sounds can be associated with different file types. For example, a first sound is associated with audio files and a second sound is associated with video files. Thus, the user can distinguish between audio files and video files based on the audible cue generated. If no cue is generated, then the file must be of a type other than an audio file or a video file.

Figure 7:
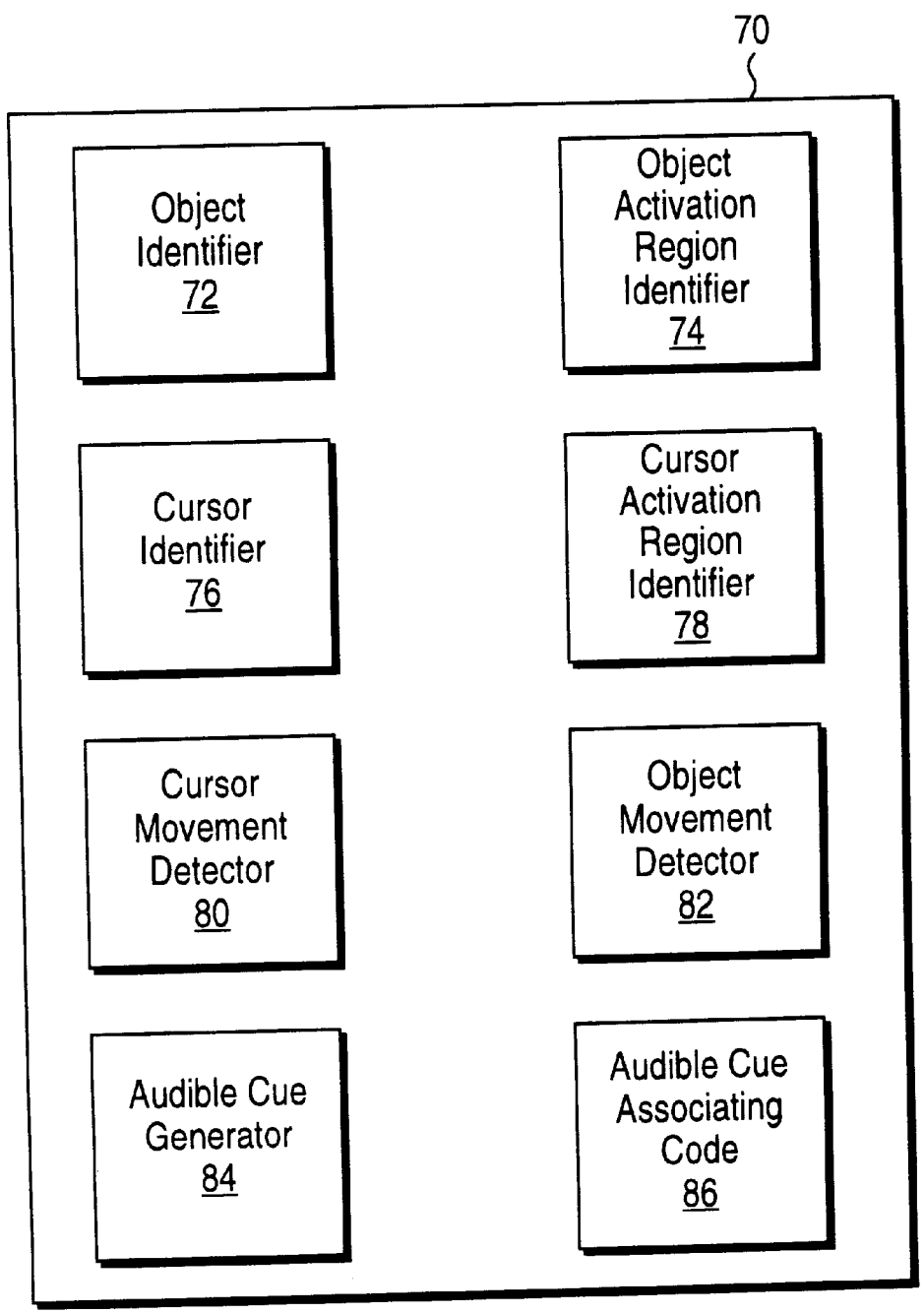
FIG. 7 illustrates an embodiment of a computer-readable medium containing various sets of instructions, code sequences, configuration information, and other data.

FIG. 7 illustrates an embodiment of a computer-readable medium 70 containing various information used by a computer or other processing device. The embodiment illustrated in FIG. 7 is suitable for use with the systems for generating an audible cue described above. The various information stored on medium 70 is used to perform various operations, such as the procedure described above with respect to FIG. 4. Computer-readable medium 70 may also be referred to as a processor-readable medium. Computer-readable medium 70 may be any type of magnetic, optical, or electrical storage medium including a diskette, CD-ROM, memory device, or similar storage medium.

Computer-readable medium 70 includes an object identifier 72 that identifies various objects in a display, web page, or other interface. An object activation region identifier 74 identifies an object activation region associated with each display object and recalculates the region if the display object moves. A cursor identifier 76 identifies the cursor on the display. A cursor activation region identifier 78 identifies a cursor activation region associated with the cursor and recalculates the region as the cursor moves on the display. A cursor movement detector 80 monitors the movement of the cursor on the display. Object movement detector 82 monitors the movement of objects on the display. An audible cue generator 84 generates an audible cue associated with a particular object when the cursor activation region intersects the object's object activation region. Audible cue associating code 86 associates an audio file or sound file with one or more display objects or display object types.

Alternate embodiments of computer-readable medium 70 may include only a portion of the information shown in FIG. 7. For example, medium 70 may contain detectors 80 and 82, as well as generator 84 and code 86. When these items 80–86 are implemented by an end-system, other code sequences or procedures may be generated by the end-system such as identifiers 72–78. Those of ordinary skill in the art will appreciate that various code sequences, instructions, and procedures may be utilized by an end-system to implement the teachings of the present invention.

Figure 8:
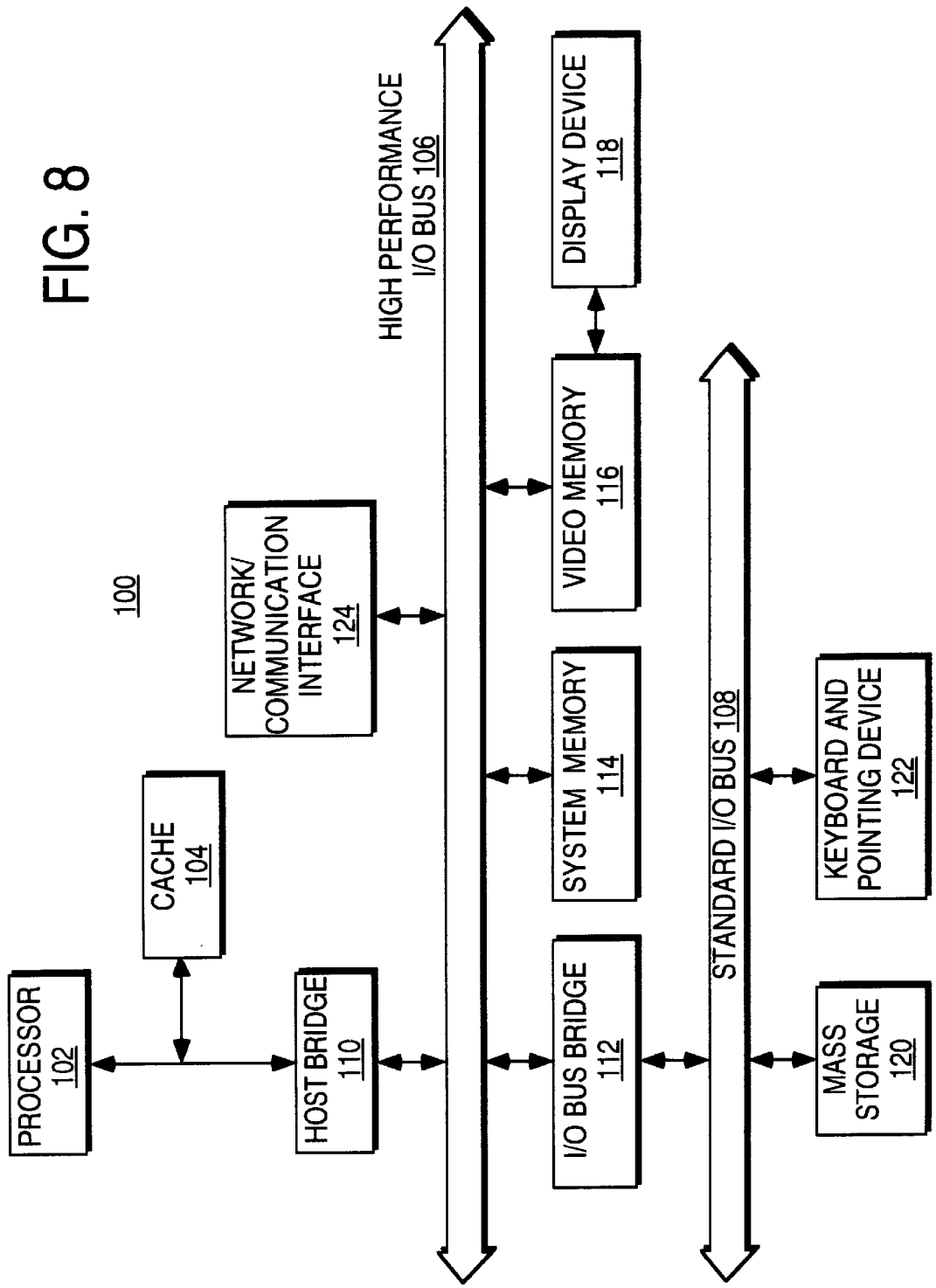
FIG. 8 illustrates an embodiment of a hardware system suitable for use with the present invention.

FIG. 8 illustrates an embodiment of a hardware system suitable for use with the present invention. In the illustrated embodiment, hardware system 100 includes processor 102 and cache memory 104 coupled together as shown. Additionally, hardware system 100 includes a high performance input/output (I/O) bus 106 and a standard I/O bus 108. A host bridge 110 coupled processor 102 to high performance I/O bus 106, whereas an I/O bus bridge 112 couples the two buses 106 and 108 to each other. Coupled to bus 106 are network/communication interface 124, system memory 114, and video memory 116. A display device 118 is coupled to video memory 116. Coupled to bus 108 is mass storage 120 and keyboard and pointing device 122. These elements 102–122 perform their conventional functions known in the art. In particular, network/communication interface 124 is used to provide communication between system 100 and any of a wide range of conventional networks, such as an Ethernet network, token ring network, the Internet, etc. Various types of communication mediums may be coupled to network/communication interface 124 for transmitting and receiving information. It is to be appreciated that the circuitry of interface 124 is dependent on the type of network or communication system to which system 100 is coupled.

Mass storage 120 is used to provide permanent storage for the data and programming instructions to implement the above-described functions. System memory 114 is used to provide temporary storage for the data and programming instructions when executed by processor 102. Mass storage 120 may be provided with the programming instructions by loading the programming instructions from a distribution storage medium (not shown), or by downloading the programming distributions from a server (not shown). Collectively, these elements are intended to represent a broad category of hardware systems, including but not limited to, general purpose computer systems based on the Pentium® processor or Pentium® Pro processor, manufactured by Intel Corporation of Santa Clara, Calif.

It is to be appreciated that various components of hardware system 100 may be re-arranged. For example, cache 104 may be on-chip with processor 102. Furthermore, certain implementations of the present invention may not require nor include all of the above components. For example, mass storage 120, keyboard and pointing device 122, and/or display device 118 and video memory 116 may not be included in system 100. Additionally, the peripheral devices shown coupled to standard I/O bus 108 may be coupled to high performance I/O bus 106. In addition, in some implementations, only a single bus may exist with the components of hardware system 100 being coupled to the single bus. Furthermore, additional components may be included in system 100, such as a sound-generating device, additional processors, storage devices, or memories.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for indicating the status of display objects, the method comprising the steps of:
   associating an audible cue with a display object, wherein the audible cue indicates the access status of the display object;
   generating the audible cue associated with the display object if a pointer is positioned proximate the display object; and
   arbitrating, if said pointer is proximate to plural remote networked objects, to determine a selected one of said plural objects according to a maximum intersection area between said pointer and said plural objects.

2. The method of claim 1 further including the step of associating an object activation region with the display object.

3. The method of claim 2 wherein the audible cue associated with a particular display object is generated if the pointer is relatively positioned in a predetermined relationship to the object activation region associated with the particular display object.

4. The method of claim 1 further including the step of associating an activation region with the pointer.

5. The method of claim 1 wherein the pointer is a cursor.

6. The method of claim 1 wherein the display object is a navigational link.

7. A method for generating an audible cue indicating the status of a display object, comprising:
   identifying an object activation region associated with the display object;
   identifying a cursor activation region associated with a cursor;
   arbitrating, when said cursor intersects plural object activation regions, to determine the display object being selected by said cursor; and
   generating the audible cue when the object activation region intersects the cursor activation region, wherein the audible cue indicates the access status of the display object;
   wherein a display contains a plurality of display objects, and wherein said arbitrating determines the display object according to a maximum intersection between said cursor and said plural activation regions.

8. The method of claim 7 further including identifying a new cursor activation region in response to movement of the cursor.

9. The method of claim 7 further including identifying a new object activation region in response to movement of the display object.

10. The method of claim 7 wherein the display object is a navigational link.

11. A method for generating audible cues indicating the status of display objects, the method comprising the steps of:
   identifying an object activation region associated with each display object;
   associating an audible cue with at least one display object, wherein the audible cue indicates the access status of the display object;
   identifying a cursor activation region associated with a cursor; and
   generating the audible cue associated with a particular object if the particular object has an associated audible cue and if the object activation region associated with the particular object intersects the cursor activation region;
   wherein said identifying includes arbitrating when plural activation regions are associated with the cursor, said arbitration determining the cursor activation region as that region having a largest intersection with the cursor.

12. The method of claim 11 further including the step of identifying a new cursor activation region in response to movement of the cursor.

13. The method of claim 11 further including the step of identifying a new object activation region associated with a particular object in response to movement of the particular object.

14. A computer software product including a medium readable by a processor, the medium having stored thereon:
 a first sequence of instructions which, when executed by the processor, causes the processor to associate an audible cue with a display object, wherein the audible cue indicates the access status of the display object;
 a second sequence of instructions which, when executed by the processor, causes the processor to generate the audible cue associated with the display object if a pointer is positioned proximate the display object; and
 a third sequence of instructions which, when executed by the processor, causes the processor to determine if said pointer is proximate to plural remote networked objects, and if so, to arbitrate to determine a selected one of said plural objects according to a maximum intersection area between said pointer and said plural objects.

15. The computer software product of claim 14 further including a third sequence of instructions which, when executed by the processor, causes the processor to associate an object activation region with the display object.

16. The computer software product of claim 15 wherein the second sequence of instructions generates the audible cue associated with the display object if the pointer is relatively positioned in a predetermined relationship to the object activation region associated with the display object.

17. The computer software product of claim 14 further including a fourth sequence of instructions which, when executed by the processor, causes the processor to identify a new object activation region in response to movement of the display object.

18. A system for indicating the status of display objects, the system comprising:
 a display device configured to display a plurality of display objects; and
 a processor coupled to the display device, wherein the processor is configured to
  associate an audible cue associated with a display object,
  generate the audible cue associated with the display object if a pointer is positioned proximate the display object, and
  arbitrate if said pointer is proximate to plural display objects to determine a selected one of said plural objects,
 wherein the audible cue indicates the access status of the display object.

19. The system of claim 18 wherein each display object has an associated object activation region.

20. The system of claim 19 wherein the audible cue associated with a particular display object is generated if the pointer is relatively positioned in a predetermined relationship to the object activation region associated with the particular display object.

21. A method for indicating the status of display objects, the method comprising:
 associating an audible cue with a display object, wherein the audible cue indicates the status of the display object;
 generating the audible cue associated with the display object if a pointer is positioned proximate the display object;
 arbitrating, if said pointer is proximate to plural display objects, to determine a selected one of said plural objects according to a maximum intersection area between said pointer and said plural objects;
 wherein the display object is a navigational link.

22. A method for generating an audible cue indicating the status of a display object, the method comprising:
 identifying an object activation region associated with the display object;
 identifying a cursor activation region associated with a cursor;
 generating the audible cue when the object activation region intersects the cursor activation region, wherein the audible cue indicates the status of the display object;
 arbitrating, if said pointer is proximate to plural remote networked objects, to determine a selected one of said plural objects;
 wherein the display objet is a navigational link.

23. The method of claim 22, further comprising:
 identifying a new cursor activation region in response to movement of the cursor.

24. The method of claim 22, further comprising:
 identifying a new object activation region in response to movement of the display object.

* * * * *